(12) United States Patent
Nishimura et al.

(10) Patent No.: US 8,231,252 B2
(45) Date of Patent: Jul. 31, 2012

(54) LAMP UNIT AND PROJECTOR EMPLOYING SAME

(75) Inventors: Yoshifumi Nishimura, Tokyo (JP); Hiroaki Takamatsu, Tokyo (JP)

(73) Assignee: NEC Display Solutions, Ltd., Tokyo (JP)

( * ) Notice: Subject to any disclaimer, the term of this patent is extended or adjusted under 35 U.S.C. 154(b) by 193 days.

(21) Appl. No.: 12/805,047

(22) Filed: Jul. 8, 2010

(65) Prior Publication Data

US 2010/0315600 A1   Dec. 16, 2010

Related U.S. Application Data

(63) Continuation of application No. 12/083,313, filed as application No. PCT/JP2006/068317 on Sep. 13, 2007, now Pat. No. 7,775,689.

(30) Foreign Application Priority Data

Oct. 6, 2006 (JP) .................. 2006-275086

(51) Int. Cl.
    *G03B 21/16* (2006.01)

(52) U.S. Cl. .......... 362/373; 362/294; 362/345; 353/60; 353/61; 353/57; 353/58

(58) Field of Classification Search .................. 362/294, 362/373, 345; 353/57, 58, 60, 61; 236/49.3; 361/688; 417/423.1, 413.1
See application file for complete search history.

(56) References Cited

U.S. PATENT DOCUMENTS

| | | | | |
|---|---|---|---|---|
| 3,792,230 A * | 2/1974 | Ray | .............................. | 392/410 |
| 3,806,236 A | 4/1974 | Downing | | |
| 4,258,987 A * | 3/1981 | Nishikawa et al. | ............. | 353/95 |
| 5,634,711 A * | 6/1997 | Kennedy et al. | .............. | 362/119 |
| 6,224,248 B1 * | 5/2001 | Chiba | ........................... | 362/580 |
| 7,540,633 B2 * | 6/2009 | Nishimura et al. | ........... | 362/294 |

FOREIGN PATENT DOCUMENTS

| | | |
|---|---|---|
| JP | 2001-183746 | 7/2001 |
| JP | 2002-239770 | 8/2002 |
| JP | 2003-215706 | 7/2003 |
| JP | 2004-177885 | 6/2004 |
| JP | 2005-107470 | 4/2005 |
| JP | 2005-183823 | 7/2005 |
| WO | WO 2004/102068 A1 | 11/2004 |

* cited by examiner

*Primary Examiner* — Anabel Ton
(74) *Attorney, Agent, or Firm* — McGinn IP Law Group, PLLC

(57) ABSTRACT

A projector includes a light source, a pump which supplies a compressed gas to cool the light source, and an ejector member having a hole, in which, a tube connects the pump to the ejector member, the compressed gas is discharged from the hole, and a diameter of the hole is in a range from 0.2 mm to 0.4 mm.

18 Claims, 9 Drawing Sheets

LAMP UNIT AND PROJECTOR EMPLOYING SAME

The present application is a Continuation Application of U.S. patent application Ser. No. 12/083,313, filed on May 12, 2008 now U.S. Pat. No. 7,775,689, based on International Application PCT/JP2006/068317 filed on Sep. 13, 2007, which is based on and claims priority from Japanese patent application No. 2006-275086, filed on Oct. 6, 2006, the entire contents of which are incorporated herein by reference.

TECHNICAL FIELD

The present invention relates to a lamp unit including a cooling mechanism.

BACKGROUND ART

Generally, projectors include a cooling device for cooling an installed lamp. A fan is widely used as the cooling device.

JP-A No. 2003-215706 discloses a lamp unit including a reflector with a lamp located at its focal point and a holder for holding the open end of the reflector. The open end of the reflector is covered with a transparent plate for preventing fragments from being scattered around in the event that the lamp blows up.

The holder has an inlet port for introducing air into the reflector and an outlet port for discharging air from the reflector. When cooling air from a fan disposed outside of the reflector is introduced from the inlet port into the reflector and air in the reflector is discharged from the outlet port, an air flow (cooling air flow) is developed in the reflector, and impinges upon the lamp to cool the lamp.

DISCLOSURE OF THE INVENTION

However, it is difficult to obtain a sufficient cooling capability only when the air flow (cooling air flow) produced by introducing the cooling air from the fan into the reflector impinges upon the lamp.

High-pressure mercury lamps that are widely used with projectors have a heated region that should desirably be cooled locally. It is difficult to perform such local cooling with a fan.

It is an exemplary object of the present invention to provide a lamp unit which will solve the above problems and which is capable of applying cooling air at a sufficient speed highly accurately to a desired region of a lamp.

To achieve the above object, a lamp unit according to an exemplary aspect of the present invention comprising a reflector with a lamp mounted therein, by which light from the lamp is reflected, a reflector holder that holds the reflector, and an ejector member fixed to the reflector holder, which ejects air to cool the lamp. The ejector member includes an insertion member to which a tubular air supply member that supplies compressed air to the ejector member is inserted, a fluid passage forming member that includes a fluid passage to which air is supplied from a distal end of the air supply member inserted in the insertion member, and at least one small hole defined in a distal end of the ejector member and that extends through a fluid passage wall defining the fluid passage. The fluid passage forming member includes a fluid passage cross-sectional area which is smaller at the distal end of the ejector member than at the insertion member.

According to the present invention as described above, compressed air from a pressurized is supplied through the air supply member to the ejector member which discharges the cooling air through the small hole defined in the distal end thereof. The cooling air discharged from the small hole is applied to the lamp unit to cool the lamp locally.

In the present invention, furthermore, the reflector with the lamp mounted therein is held by the reflector holder, and the ejector member is fixed to the reflector holder. Thus, both the lamp and the ejector member are positioned with respect to the reflector holder. Since the same member is used as a reference for positioning the lamp and the ejector member, the positional relationship between the lamp and the ejector member is set with high accuracy, with the result that the cooling air discharged from the small hole of the ejector member can be applied highly accurately to a desired area of the lamp.

If the lamp and the ejector member are positioned with respect to different reference members, then as the positioning accuracy with which the reference members position the lamp and the ejector member and the positioning accuracy between the reference members need to be taken into account, it is difficult to set the positional relationship between the lamp and the ejector member highly accurately.

According to the present invention, the air supply member is inserted in the ejector member to realize an exchangeable unit structure. In such a structure, the size of the cross section of the fluid passage at the insertion member is greater than the outer profile of the air supply member. If the fluid passage cross-sectional area is the same as the fluid passage cross-sectional area at the insertion member throughout the fluid passage forming member, then the compressed air supplied from the air supply member is introduced into the fluid passage as a large space, whereupon the air suffers a pressure loss, resulting in a reduction in the speed of the air discharged from the small hole. The fluid passage cross-sectional area of the fluid passage forming member can be reduced to minimize a reduction, caused by the pressure loss, in the speed of the air discharged from the small hole. According to the present invention, since the fluid passage cross-sectional area at the distal end of the ejector member is smaller than the fluid passage cross-sectional area at the insertion member, the speed of the air discharged from the small hole is increased.

According to the present invention, as described above, inasmuch as the cooling air is discharged at a sufficient speed from the small hole of the ejector member, and the cooling air is applied highly accurately to a desired area of the lamp (high-pressure mercury lamp or the like), the lamp can be maintained at an appropriate temperature. Therefore, the lamp is prevented from becoming clouded and blackened (due to mercury deposition or anode spot on the inner wall surface of the lamp), and, as a consequence, has a longer service life and is of higher reliability than heretofore.

The above and other objects, features, and advantages of the present invention will become apparent from the following description with reference to the accompanying drawings which illustrate examples of the present invention.

BEST MODE FOR CARRYING OUT THE INVENTION

Figure 1:
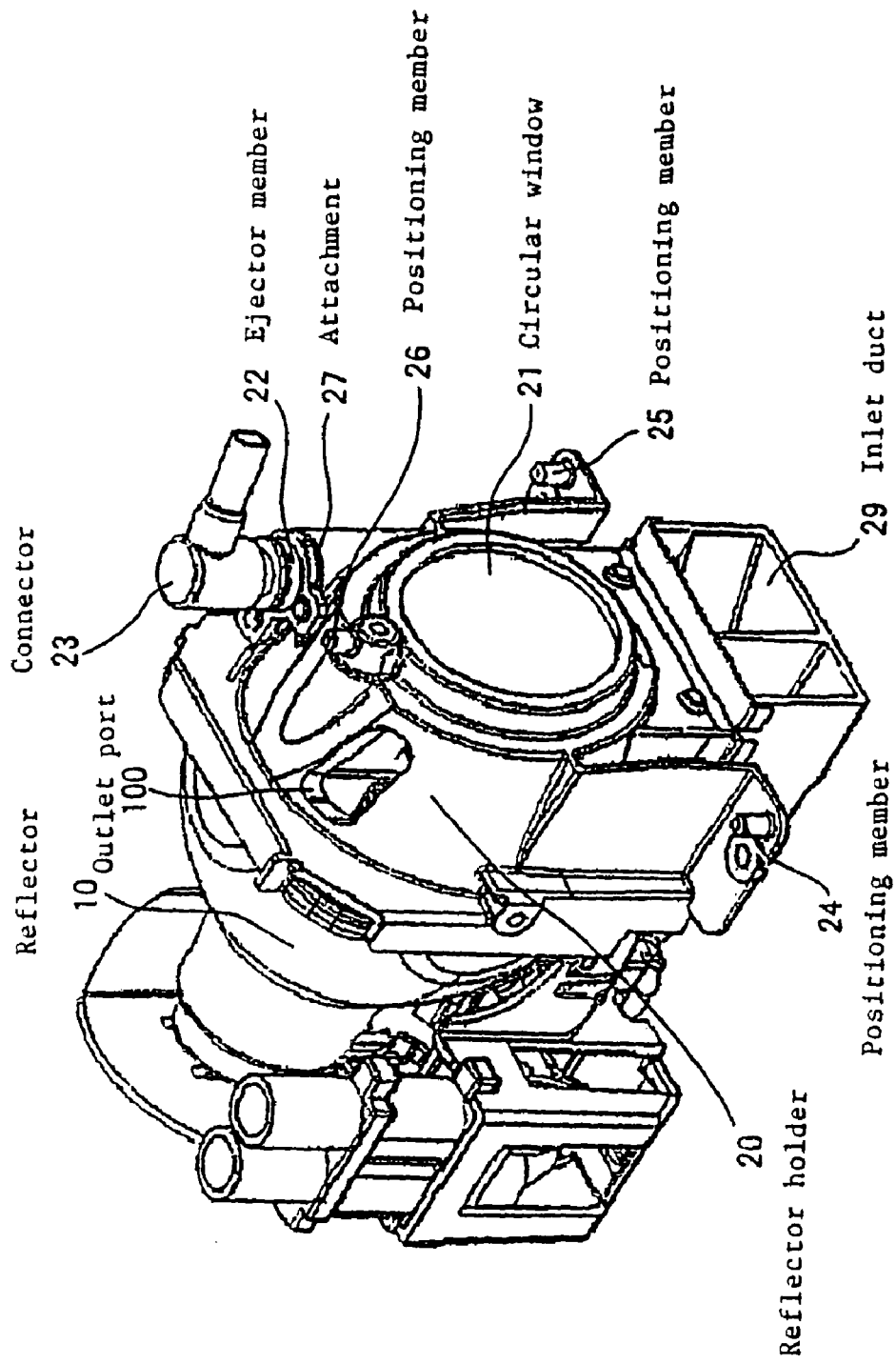
FIG. 1 is a perspective view of a lamp unit according to an exemplary embodiment of the present invention.

FIG. 1 is a perspective view of a lamp unit according to an exemplary embodiment of the present invention. As shown in FIG. 1, the lamp unit, which is to be incorporated in a projector, comprises reflector 10 including a lamp and reflector holder 20 holding the open end of reflector 10. Reflector 10 has a concave reflecting surface, e.g., a reflecting surface as a paraboloid of revolution, with the lamp located at the focal point thereof. Light from the lamp is emitted directly from the opening or reflected by the reflecting surface and then emitted from the opening in a certain direction.

Reflector holder 20 is in the form of a cup covering the open end of reflector 10, and has circular window 21 for passing therethrough the light emitted from the open end of reflector 10. Window 20 is made of a transparent material (such as glass or resin) having such properties that it passes therethrough light in a wavelength range used in the device which incorporates the lamp unit.

Reflector holder 20 includes attachment 27 on which ejector member 22 is mounted, positioning members 24 through 26 by which reflector holder 20 is positioned on an engine base, inlet duct 29 for introducing air from a fan, not shown, into the reflector, and outlet port 100 for discharging air from the reflector. Positioning members 24 through 26 are in the form of pins for engaging in receptacles (holes or the like) in certain locations on an external member. Reflector holder 20 may have four or more positioning members. Reflector holder 20 are positioned by positioning members 24 through 26 and then fastened to the engine bases by screws. In addition to the lamp unit, optical components of an illuminating optical system, a projection lens, and an image display device (DMD) are mounted on the engine base.

Figure 2:
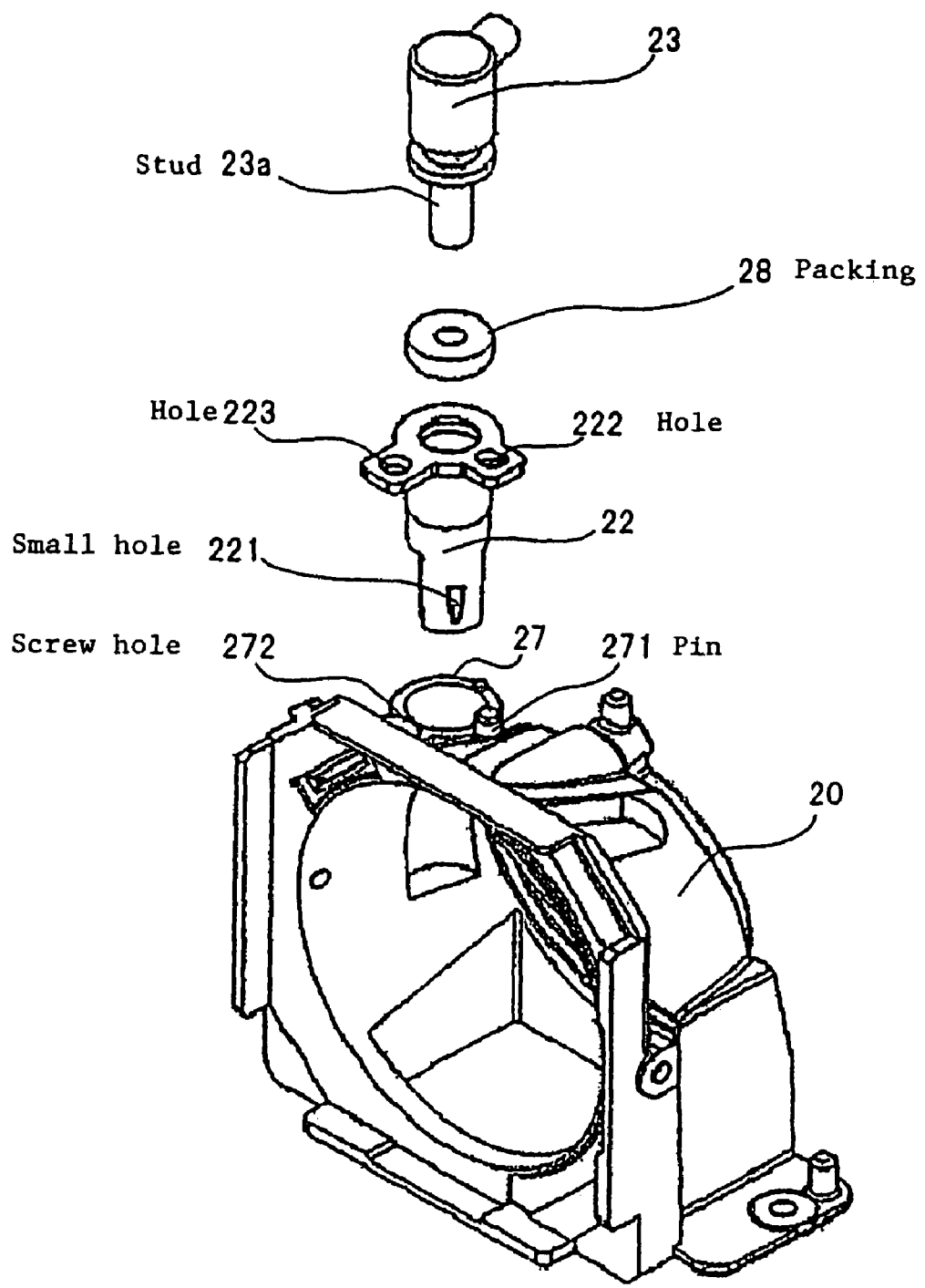
FIG. 2 is an exploded perspective view of a nozzle assembly including an ejector member shown in FIG. 1.

FIG. 2 is an exploded perspective view of a nozzle assembly including ejector member 22. As shown in FIG. 2, ejector member 22 is tubular and has small hole 221 for ejecting air which is defined therein near the distal end thereof. Ejector member 22 has an open end remote from the distal end thereof. Connector 23 has stud 23*a* inserted into ejector member 22 through the open end thereof.

Connector 23 comprises an L-shaped vent pipe and has an end attached to a tube connected to the outlet port of a pressurizing pump, not shown. Tubular stud 23*a* for supplying ejector member 22 with compressed air is mounted on the other end of connector 23. Stud 23*a* is inserted through packing 28 into ejector member 22. Packing 28 serves to prevent air from leaking from the junction between packing 23*a* and ejector member 22, and is made of silicone, for example. Packing 28 may be fixed to the open end of ejector member 22 by an adhesive, and stud 23*a* may removably be fixed in position by fixed packing 28.

The open end of ejector member 22 has holes 222, 223 through which ejector member 22 is fastened to attachment 27 of reflector holder 20. Attachment 27 has an opening through which ejector member 22 is inserted, and also has pin 271 and screw hole 272 near the opening. Pin 271 is inserted in hole 222 of ejector member 22, and ejector member 22 is positioned to keep hole 223 immediately above screw hole 272. A screw, not shown, is then inserted through hole 223 into screw hole 272, fastening ejector member 22 to attachment 27 of reflector holder 20. With ejector 22 fastened to reflector holder 20, compressed air discharged from small hole 221 impinges upon a desired area of the lamp in reflector 10.

Figure 3:
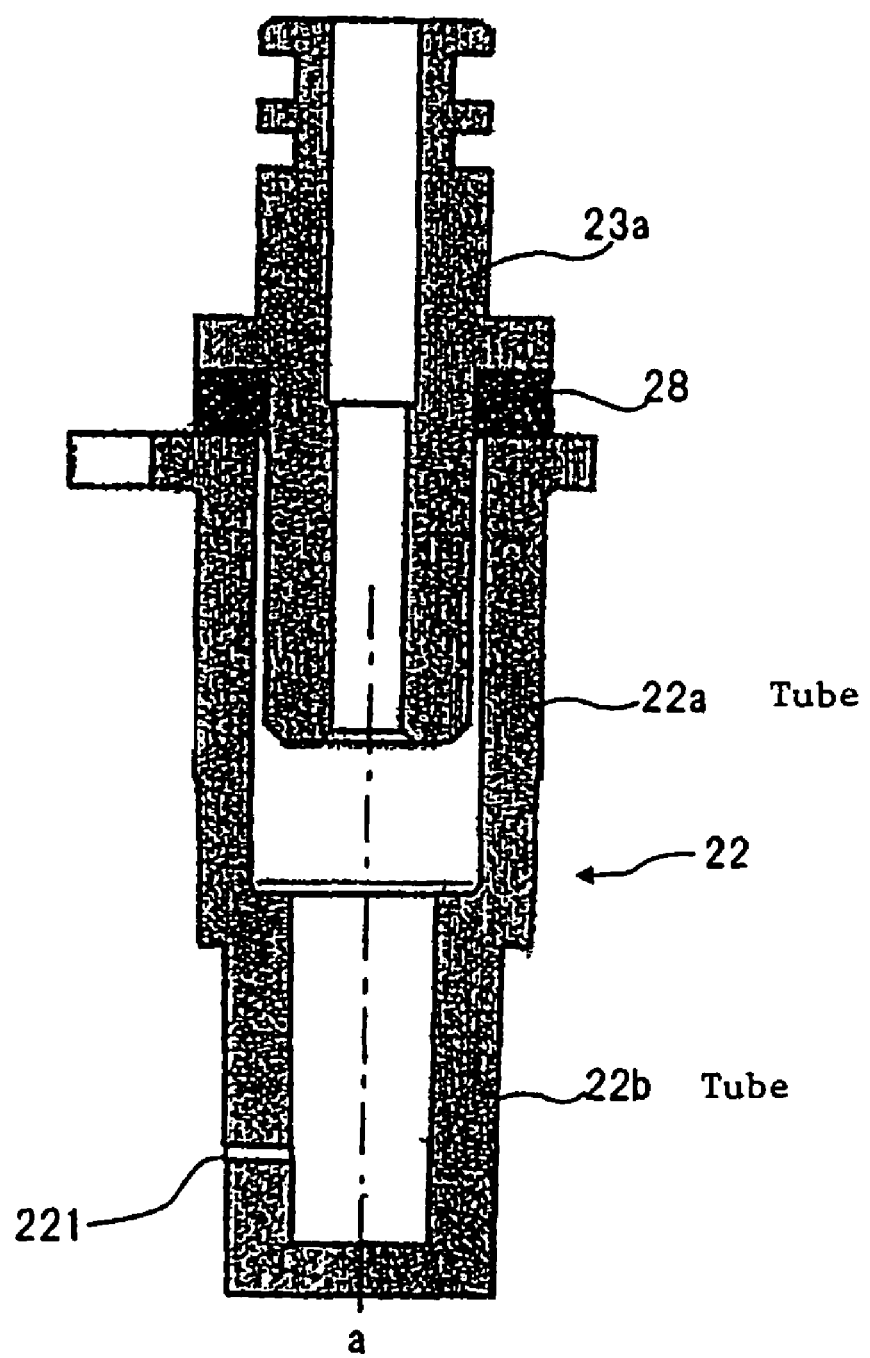
FIG. 3 is a cross-sectional view of an example of the ejector member shown in FIG. 1.

FIG. 3 is a cross-sectional view of an example of ejector member 22. As shown in FIG. 3, ejector member 22 comprises tube 22*a* into which stud 23*a* is inserted and tube 22*b* which is smaller in side diameter than tube 22*a*. Tubes 22*a*, 22*b* have respective centers "a" substantially aligned with each other on a sectional plane transverse to the longitudinal direction of these tubes. Small hole 221 is defined in the side wall of tube 22*b*. The side wall of tube 22*b* has a thickness which should preferably about three times the diameter of small hole 221. For example, if the diameter of small hole 221 is 0.3 mm, then the thickness of the side wall of tube 22*b* is 1.0 mm.

As stud 23*a* is inserted in ejector member 22, the inside diameter of tube 22*a* is greater than the outer profile of stud 23*a*. If the inside diameters of tubes 22*a*, 22*b* are essentially the same as each other, then the inside diameter of the entire tube assembly is greater than the outer profile of stud 23*a*. In other words, the cross-sectional area of the fluid passage in ejector member 22 is greater than the cross-sectional area of the fluid passage in stud 23*a*. In this case, compressed air discharged from stud 23*a* is introduced into the fluid passage as a large space and thereafter ejected out of ejector member 22 through small hole 221. When the compressed air discharged from stud 23*a* is introduced into the fluid passage as a large space, the air suffers a pressure loss, resulting in a reduction in the speed of the air discharged from small hole 221.

The difference between the cross-sectional area of the fluid passage in ejector member 22 and the cross-sectional area of the fluid passage in stud 23*a* is reduced to minimize a reduction, caused by the pressure loss, in the speed of the air discharged from small hole 221. Specifically, the cross-sectional area of the fluid passage in ejector member 22 which leads to small hole 221 is reduced stepwise (or continuously) from the side where the stud is inserted, thereby lowering a pressure loss and increasing the speed of the air discharged from small hole 221. With the structure shown in FIG. 3, since the inside diameter of tube 22*b* is smaller than the inside diameter of tube 22*a*, the cross-sectional area of the fluid passage in ejector member 22 is reduced as much, for thereby increasing the speed of the air discharged from small hole 221.

Figure 4:
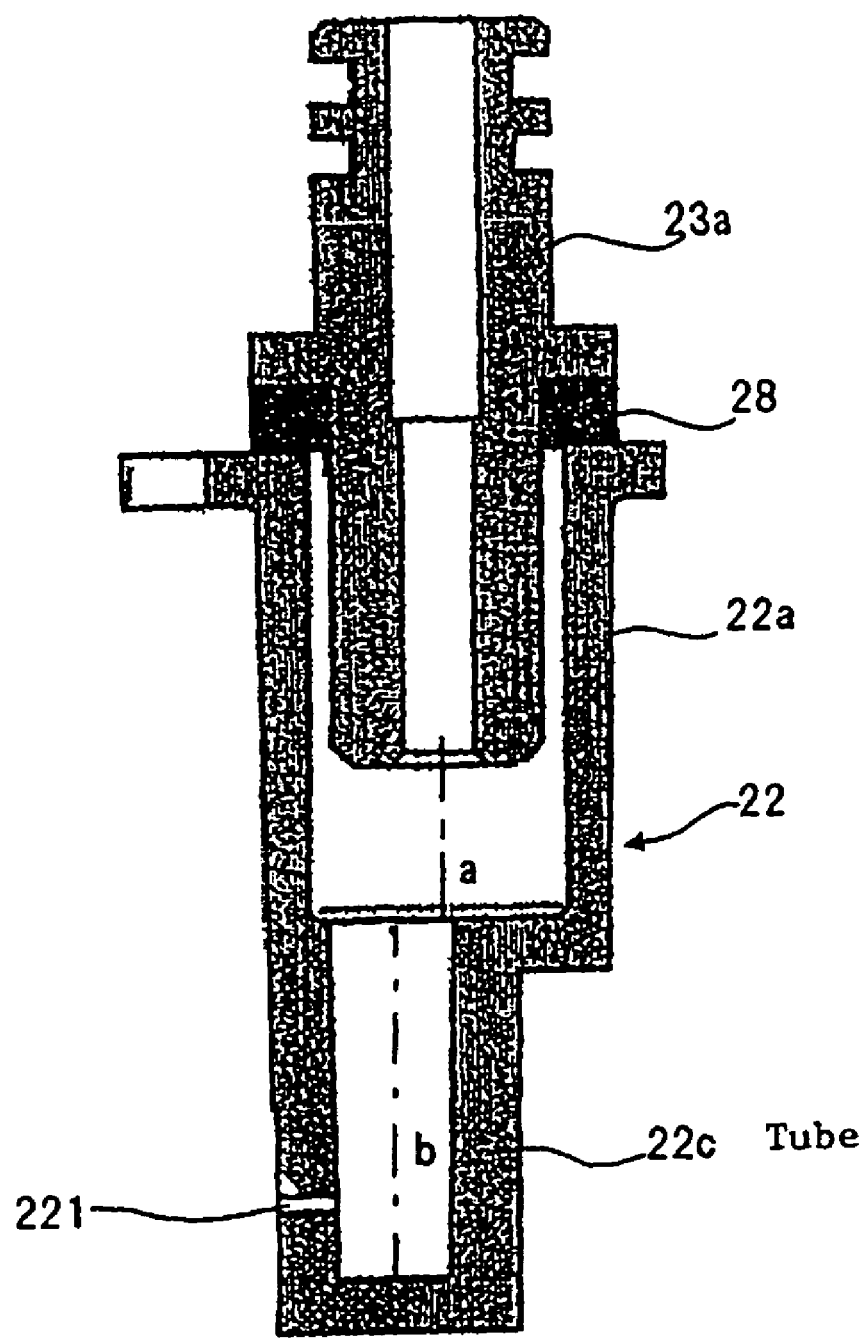
FIG. 4 is a cross-sectional view of another example of the ejector member shown in FIG. 1.

FIG. 4 is a cross-sectional view of another example of ejector member 22. As shown in FIG. 4, ejector member 22 comprises tube 22*a* into which stud 23*a* is inserted and tube 22*c* which is smaller in side diameter than tube 22*a*. Tubes 22*a*, 22*c* have respective centers displaced from each other in a sectional plane transverse to the longitudinal direction of these tubes. Specifically, ejector member 22 is of an eccentric structure wherein the center "b" of tube 22*c* is displaced from the center "a" of tube 22*a* toward the side where small hole 221 is defined.

In the ejector member shown in FIG. 3, a step is present in the boundary between tube 22*a* and tube 22*b* on the side where small hole 221 is defined, and the outlet port of small hole 221 is spaced from the lamp by the step. The speed of the compressed air discharged from small hole 221 is lower as it is spaced greater from the outlet port. According to the eccentric structure shown in FIG. 4, there is no step in the boundary between tube 22a and tube 22c on the side where small hole 221 is defined. In the absence of the step, outlet port of small hole 221 is positioned more closely to the lamp, so that the speed of the compressed air for cooling the lamp can be higher than with the structure shown in FIG. 3.

Figure 5:
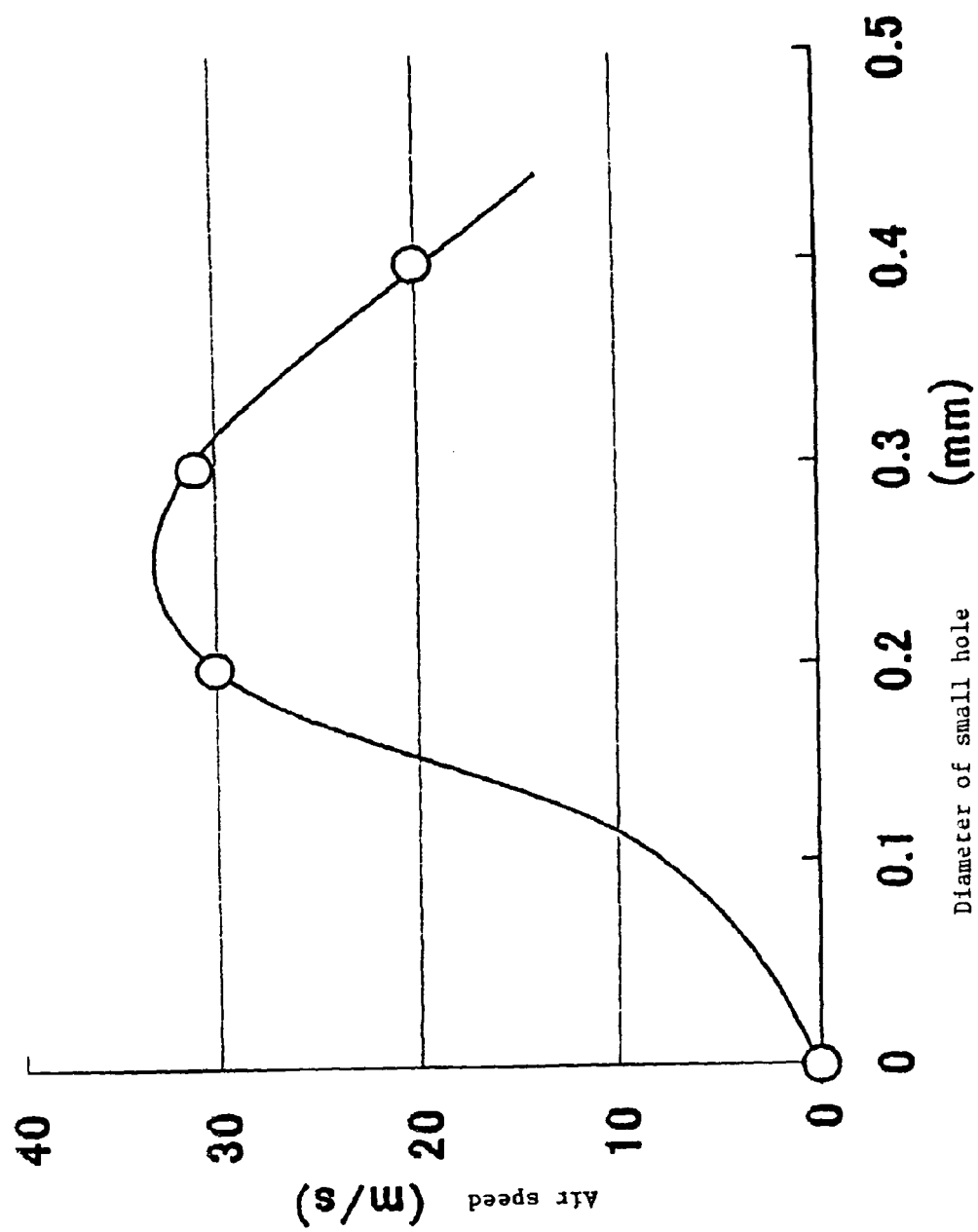
FIG. 5 is a characteristic diagram showing the relationship between the diameter of a small hole and the air speed.

The speed of the compressed air discharged from small hole 221 varies depending on the diameter of small hole 221. FIG. 5 shows the relationship between the diameter of the small hole and the air speed. The graph shown in FIG. 5 indicates the results of an experiment in which the relationship between the diameter of the small hole and the air speed was measured when constant compressed air was introduced. The results show that if the diameter of small hole 221 is smaller than 0.2 mm, then the value of the air speed drops sharply because of increased resistance to the compressed air as it passes through small hole 221, and if the diameter of small hole 221 is in excess of 0.4 mm, then the value of the air speed becomes lower than 20 m/s. As at least the air speed of about 20 m/s is required for locally cooling the lamp used in the projector, the diameter of small hole 221 should preferably be in the range from 0.2 mm to 0.4 mm. More preferably, the diameter of small hole 221 should be in the range from 0.2 mm to 0.3 mm. With this diameter range, the air speed is equal to or higher than 30 m/s.

The positional relationship between ejector member 22 and the lamp (light emission tube) will be described in specific detail below.

Figure 6:
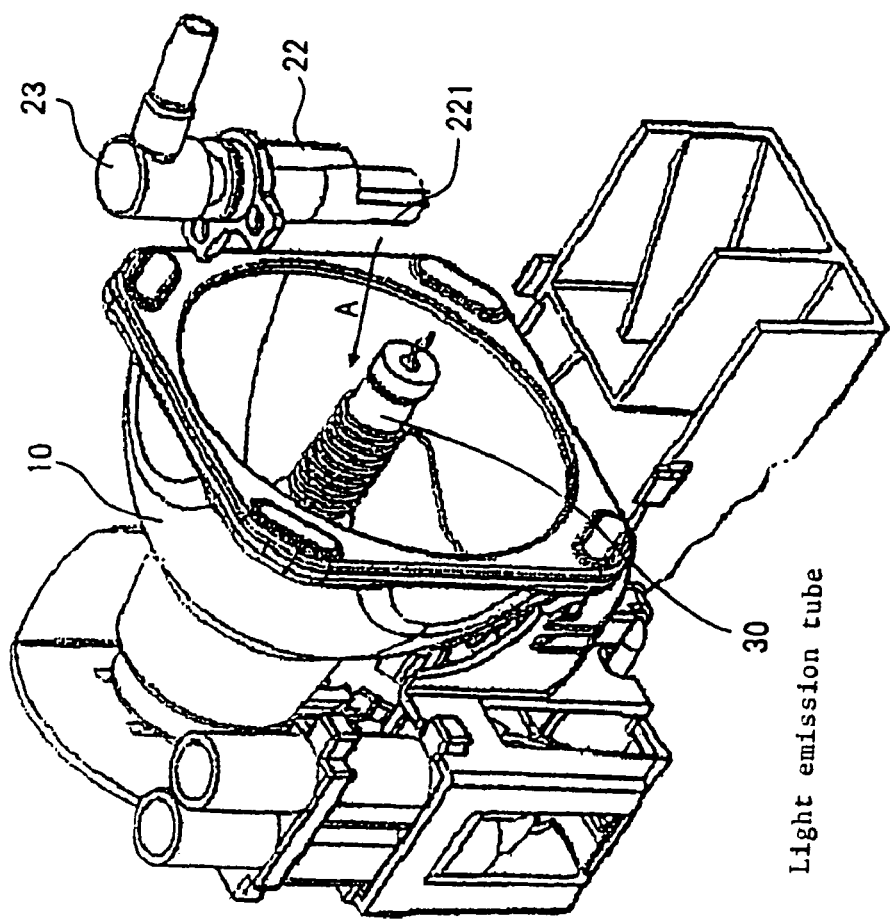
FIG. 6 is a view showing the positional relationship between the ejector member and a lamp (light emission tube)
Figure 7:
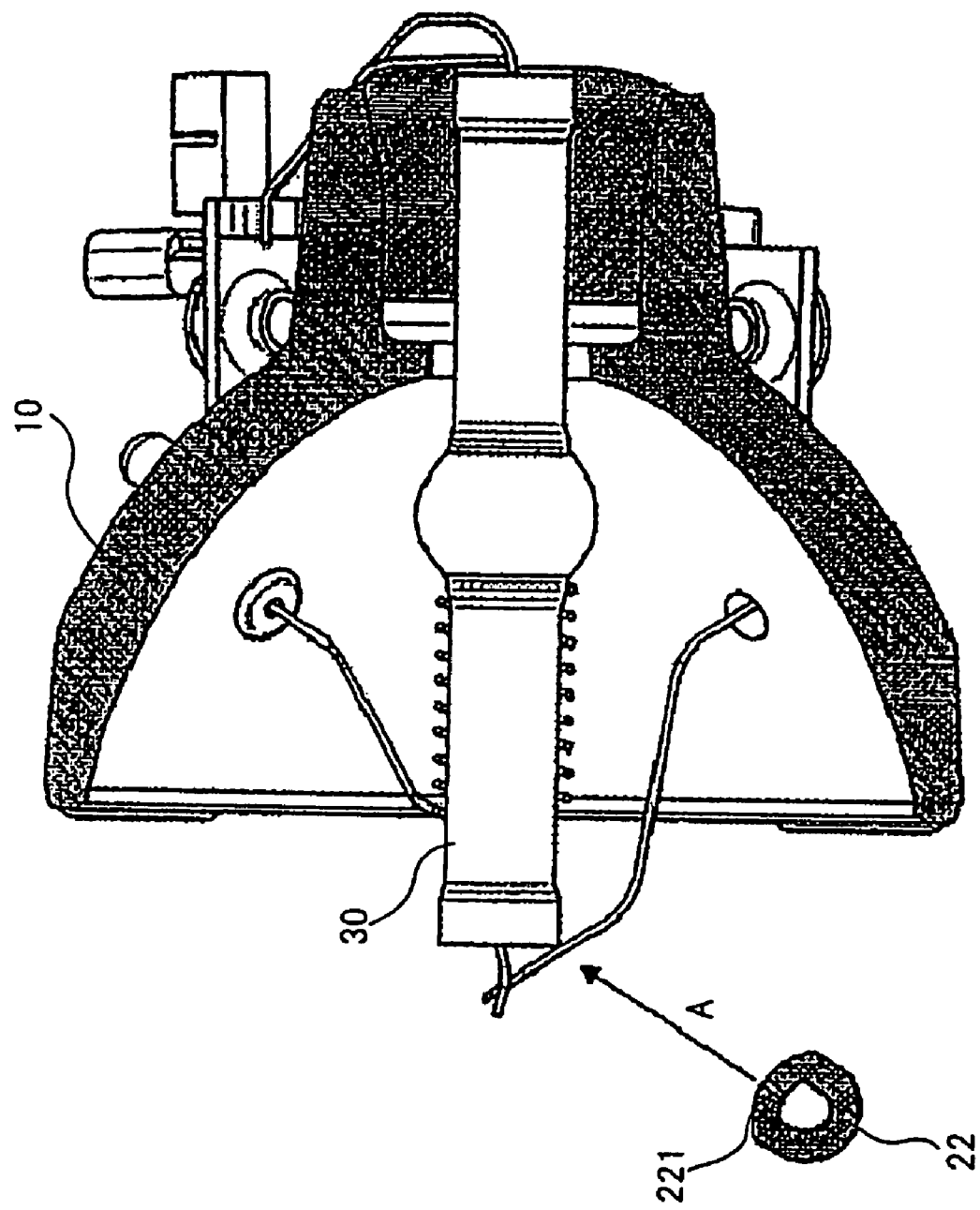
FIG. 7 is a view showing the positional relationship between the ejector member and the lamp (light emission tube)

FIGS. 6 and 7 are views showing the positional relationship between ejector member 22 and the lamp (light emission tube). FIG. 6 illustrates the lamp unit shown in FIG. 1, with reflector holder 20 omitted from illustration, and FIG. 7 illustrates the lamp unit shown in FIG. 6, showing the small hole and parts near the light emission tube as viewed from above.

As shown in FIGS. 6 and 7, ejector member 22 is disposed at such an angle that the compressed air discharged from small hole 221 impinges upon a desired area of light emission tube 30 disposed in reflector 10, and in such a position that ejector member 22 does not block light fluxes emitted from reflector 10 and passing through window 21 (light fluxes in an effective range). In FIGS. 6 and 7, the arrow A represents the direction in which the compressed air is discharged from small hole 221.

If the ejector member and the reflector holder are of an integral structure, then it is difficult to form the small hole to a nicety. With the lamp unit according to the present embodiment, since ejector member 22 is separate from reflector holder 20, small hole 221 can be machined with high accuracy. The positioning means (holes 222, 223, pin 271) shown in FIG. 2 allows the ejector member to be mounted highly accurately on the reflector holder. As the highly accurate machining process and the highly accurate positioning process are realized, it is possible to apply the compressed air from small hole 221 exactly to a desired area of the lamp. The stepped structure shown in FIG. 3 and the eccentric structure shown in FIG. 4 are effective to apply the compressed air from small hole 221 at a higher speed to a desired area of the lamp. Consequently, the desired area of the lamp can be maintained at an appropriate temperature, with the results that the lamp is prevented from becoming clouded and blackened (due to mercury deposition or anode spot on the inner wall surface of the lamp), has a long service life, and is of increased reliability.

A projector incorporating the lamp unit according to the present exemplary embodiment will be described in specific detail below.

Figure 8:
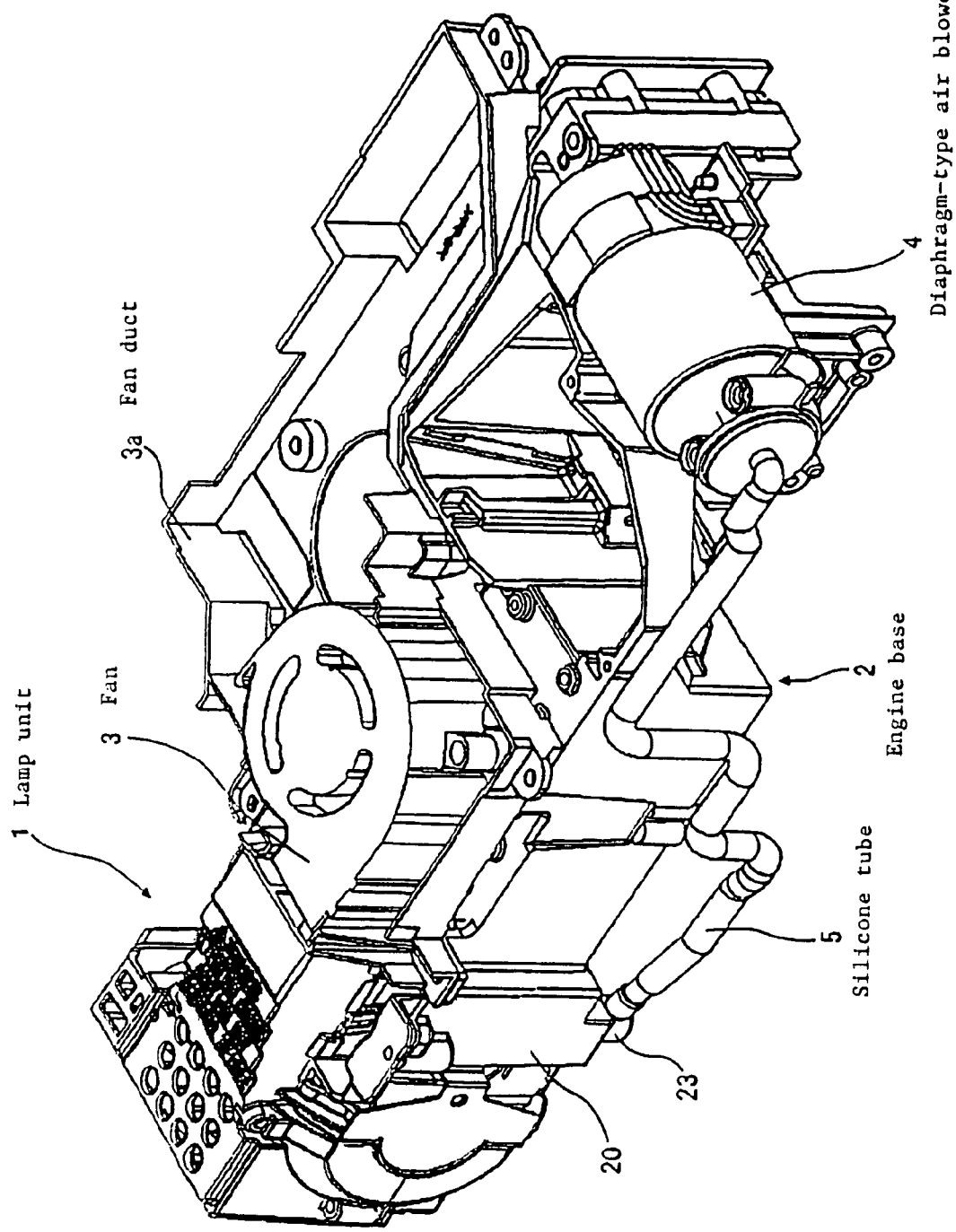
FIG. 8 is a perspective view of a major portion of a projector which incorporates the lamp unit shown in FIG. 1.
Figure 9:
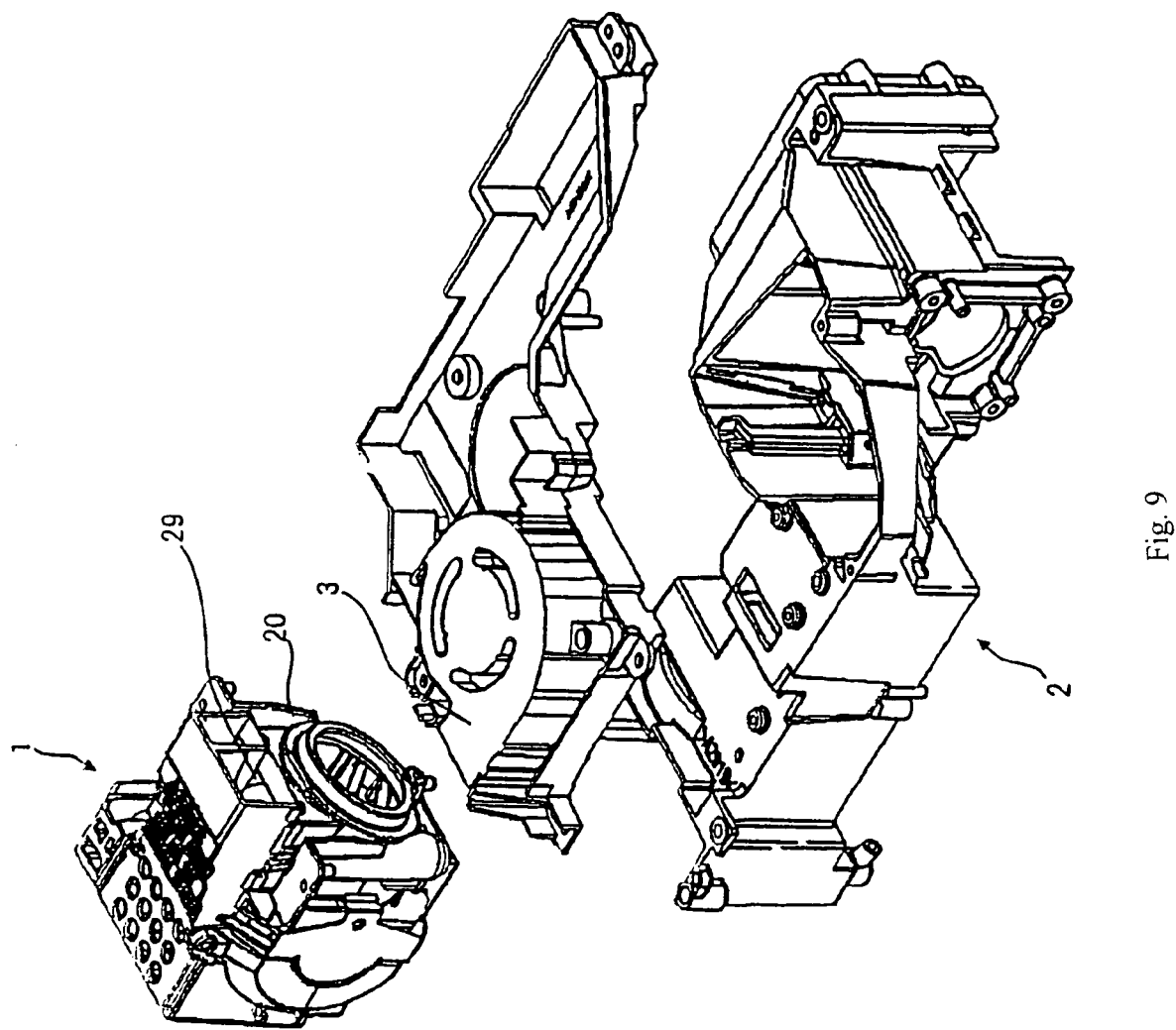
FIG. 9 is an exploded perspective view of some of the major portion of the projector shown in FIG. 8.

FIG. 8 is a perspective view of a major portion of a projector which incorporates the lamp unit shown in FIG. 1. FIG. 9 is an exploded perspective view of some of the major portion of the projector shown in FIG. 8.

As shown in FIG. 8, the major portion of the projector comprises lamp unit 1, engine base 2, fan 3, and diaphragm-type air blower 4. Lamp unit 1, which is the lamp unit shown in FIG. 1, is accurately positioned on engine base 2 by positioning members 24 through 26 and fastened to engine base 2.

Diaphragm-type air blower 4 comprises an existing pressurizing pump and has an outlet port connected to connector 23 through silicone tube 5. Compressed air discharged from diaphragm-type air blower 4 flows successively through silicone tube 5, connector 23, and stud 23a into ejector member 22, from which the compressed air is discharged through small hole 221 toward the lamp. Fan 3 draws air from fan duct 3a. An air stream delivered by fan 3 is introduced through an inlet duct 29 into reflector 10.

On engine base 2, there are mounted an illuminating optical system to which light fluxes (parallel light fluxes) emitted from window 21 of lamp unit 1 are applied, and a spatial modulator device for being irradiated with the light fluxes from the illuminating optical system. The spatial modulator device comprises, for example, a liquid crystal panel or DMD (Digital Micromirror Device), for example. Image light that is generated by the spatial modulator device is projected onto an external screen by a projection optical system, not shown.

The projector is cooled by both diaphragm-type air blower 4 and fan 3. Specifically, diaphragm-type air blower 4 can locally cool a heated region of the lamp, and fan 3 can cool the lamp in its entirety. The local cooling provided by diaphragm-type air blower 4 makes it possible to perform accurate temperature management of various parts of the lamp, which has not been achieved by the cooling provided by the fan alone, for increasing the service life of the lamp.

In the lamp unit according to the present invention, the compressed air from the pressurizing pump is supplied through the stud, which serves as an air supply member, to the ejector member which discharges the cooling air through the small hole defined in the distal end thereof. The cooling air discharged from the small hole is applied to the lamp unit to cool the lamp locally.

In the lamp unit according to the present invention, furthermore, the reflector with the lamp mounted therein is held by the reflector holder, and the ejector member is fixed to the reflector holder. Thus, both the lamp and the ejector member are positioned with respect to the reflector holder. Since the same member is used as a reference for positioning the lamp and the ejector member, the positional relationship between the lamp and the ejector member is set with high accuracy, with the result that the cooling air discharged from the small hole of the ejector member can be applied highly accurately to a desired area of the lamp.

In the lamp unit according to the present invention, as shown in FIGS. 3 and 4, the cross-sectional area of the fluid passage which leads to the small hole is reduced stepwise or continuously toward the distal end of the ejector member. Consequently, a reduction, caused by a pressure loss, in the speed of the air discharged from the small hole is minimized.

According to the present invention, as described above, inasmuch as the cooling air is discharged at a sufficient speed from the small hole of the ejector member, and the cooling air is applied highly accurately to a desired area of the lamp (high-pressure mercury lamp or the like), the lamp can be maintained at an appropriate temperature. Therefore, the lamp is prevented from becoming clouded and blackened (due to mercury deposition or anode spot on the inner wall surface of the lamp), and, as a consequence, has a longer service life and is of higher reliability than heretofore.

The lamp unit which has been described above is an example of the present invention, and can be changed in structure without departing from the scope of the invention. For example, ejector member 22 may be of any structures insofar as the cross-sectional area of the fluid passage of ejector member 22 can be reduced. For example, ejector member 22 may be of a tapered structure in which the cross-sectional area of the ejector member is gradually smaller from the side wherein stud 23a is inserted.

The small hole 221 defined in the distal end of ejector member 22 is not limited to a single small hole. Instead, a plurality of small holes 221 may be defined in the distal end of ejector member 22 for simultaneously cooling a plurality of areas of the lamp with cooling air from the small holes.

Small hole 221 may be defined in the surface of the distal end of ejector member 22 (specifically, the wall at the end of the fluid passage in tube 22b.

A plurality of ejector members 22 may be provided on reflector holder 20 for simultaneously cooling a plurality of areas of the lamp with cooling air from the ejector members.

The lamp unit according to the present invention is applicable to projectors in general. The lamp unit according to the present invention is also applicable to display devices for use with personal computers, e.g., liquid crystal display devices, in addition to projectors.

This application is based upon and claims the benefit of priority from Japanese Patent Application No. 2006-275086 filed in Japan Patent Office on Oct. 6, 2006, the contents of which are hereby incorporated by reference.

While preferred embodiments of the present invention have been described using specific terms, such description is for illustrates purposes only, and it is to be understood that changes and variations may be made without departing from the spirit or scope of the following claims.

The invention claimed is:

1. A projector, comprising:
a light source;
a pump which supplies a compressed gas to cool said light source; and
an ejector member having a hole,
wherein a tube connects said pump to said ejector member, said compressed gas being discharged from said hole, and
wherein a diameter of said hole is in a range from 0.2 mm to 0.4 mm.

2. The projector according to claim 1, wherein said pump comprises a pressurizing pump.

3. The projector according to claim 1, wherein said pump comprises a diaphragm-type air blower.

4. The projector according to claim 1, further comprising a cooling fan which supplies cooling air to the projector.

5. The projector according to claim 4, wherein said light source is cooled by both said compressed gas and said cooling air.

6. The projector according to claim 1, wherein said hole is placed in a sidewall of a tube of said ejector member.

7. The projector according to claim 6, wherein the sidewall of the tube of said ejector member has a thickness of about three times the diameter of said hole.

8. The projector according to claim 1, wherein a cross-sectional area of a fluid passage in the ejector member which leads to the hole is reduced toward a distal end of the ejector member.

9. The projector according to claim 1, wherein said ejector member comprises one of a plurality of ejector members provided in the projector to provide said compressed gas to multiple areas in the projector.

10. The projector according to claim 1, wherein said ejector member comprises:
an insertion member to which the tube is inserted; and
a fluid passage forming member having a fluid passage to which the compressed gas is supplied from the tube inserted in said insertion member.

11. The projector according to claim 10, wherein said hole is placed in a distal end of said ejector member and extends through a fluid passage wall defining said fluid passage.

12. The projector according to claim 10, wherein said fluid passage forming member has a fluid passage cross-sectional area which is smaller at a distal end of said ejector member than at said insertion member.

13. The projector according to claim 10, wherein said fluid passage forming member comprises:
a first fluid passage forming member; and
a second fluid passage forming member that has a fluid passage cross-sectional area smaller than that of said first fluid passage forming member, said hole being placed in said second fluid passage forming member.

14. A projector, comprising:
a light source;
a pump which supplies a compressed gas to cool said light source; and
an ejector member for discharging said compressed gas, said ejector member comprising:
an insertion member to which a tube that connects said pump to said ejector member is inserted;
a fluid passage forming member having a fluid passage to which the compressed gas is supplied from the tube inserted in said insertion member; and
a hole placed in a distal end of said ejector member, said hole extending through a sidewall of said fluid passage.

15. The projector according to claim 14, wherein a diameter of said hole is in a range from 0.2 mm to 0.4 mm.

16. The projector according to claim 14, wherein said fluid passage forming member has a fluid passage cross-sectional area which is smaller at the distal end of said ejector member than at said insertion member.

17. The projector according to claim 14, wherein the sidewall of the tube of said ejector member has a thickness of about three times the diameter of said hole.

18. The projector according to claim 14, wherein a cross-sectional area of the fluid passage in the ejector member which leads to the hole is reduced toward the distal end of the ejector member.

* * * * *